(Model.)
2 Sheets—Sheet 1.
J. S. CORBIN.
Disk Harrow.
No. 238,654.
Patented March 8, 1881.
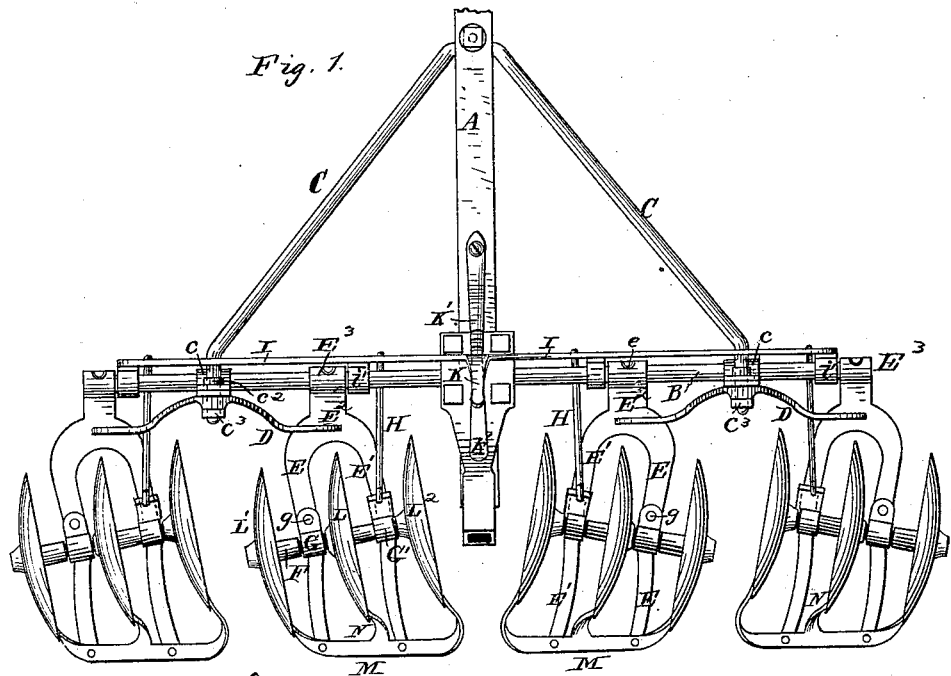
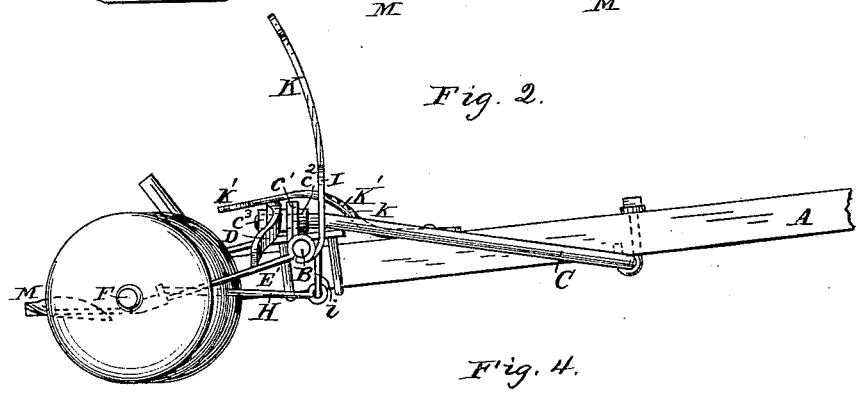
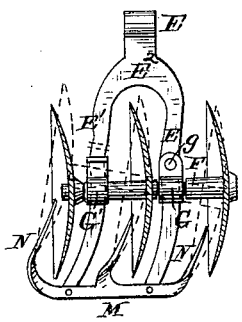
Witnesses:
N. N. Low
J. S. Barker
Inventor:
Jay S. Corbin
by Doubleday and Bliss
Attys

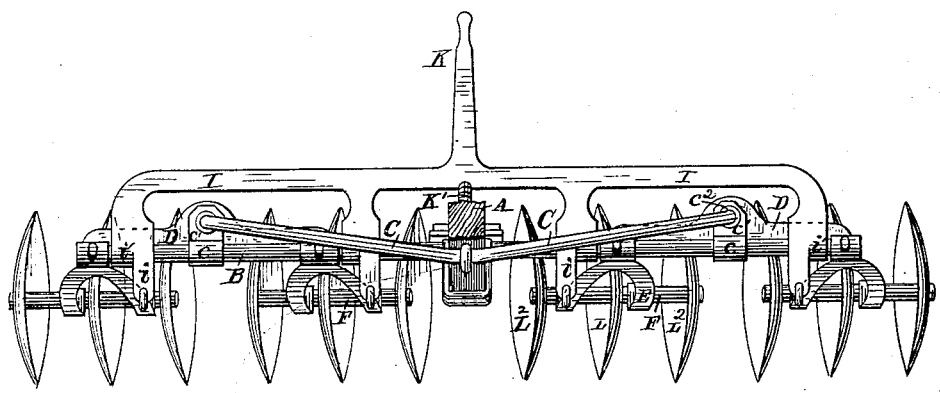

UNITED STATES PATENT OFFICE.

JAY S. CORBIN, OF GOUVERNEUR, NEW YORK.

DISK-HARROW.

SPECIFICATION forming part of Letters Patent No. 238,654, dated March 8, 1881.

Application filed June 12, 1880. (Model.)

*To all whom it may concern:*

Be it known that I, JAY S. CORBIN, of Gouverneur, in the county of St. Lawrence and State of New York, have invented certain new and useful Improvements in Disk-Harrows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a top-plan view of my improved harrow. Fig. 2 is a side elevation of the same. Fig. 3 is a front elevation. Fig. 4 is a plan view of one of the gang-frames detached, illustrating, by means of full lines and dotted lines, the different positions occupied by the gang of disks relative to the line of draft.

The main frame of the harrow is formed of a tongue, A, a transverse connecting-bar, B, and braces C C. The braces C C are secured at their forward ends to the tongue A, and at their rear ends to the bar B, one on each side of the tongue. They are shown to be each secured to the bar B by means of a strap or collar, c, having an ear or a projection, c', formed of the ends of the strap through which the bar passes, and in which it is firmly held by means of a clamping collar and nut, $c^2$ $c^3$; but other methods of fastening the braces to the transverse bar may be employed. Preferably each brace C is prolonged a short distance to the rear of the transverse bar B, that it may provide support for a lever, D, which is pivoted at the middle to the rearwardly-projecting end of the brace. The ends of these levers D extend somewhat downward, and serve a purpose to be hereinafter explained.

To the transverse bar B are hinged the supplemental frames for supporting the disk-gangs, of which I have shown and prefer to use four, having found this number the best adapted to attain several of the objects aimed at in this invention.

It has been common heretofore in constructing flexible disk-harrows to so pivot the gangs to the main frame as to allow each gang to oscillate vertically about a transverse line between the ends of the gang to conform to the surface of the ground, the one or the other end of the gang being allowed to rise or fall irrespective of the opposite end. When the gangs of harrows thus constructed are set so that the axis of the gang is inclined to the line of draft the end of the gang which is farthest advanced tends to be depressed and to cut deeper than the opposite end, and this tendency is increased when the gangs are set more sharply, or when the weight of the driver is increased, or when the soil is harder. Since these three conditions are never constant it has been found impossible practically to control the gangs so as to cause them to cut evenly. I overcome these objections by increasing the number of gangs relative to the transverse frame to which they are hinged, and by so hinging them to that frame that each can vertically oscillate throughout the whole length of the axis independently of the others.

A greater or less number of gangs may be employed than that shown, as occasion may require; but by preserving the relation above described the difficulties met with in using longer longitudinally-oscillating gangs can be obviated.

The gang-frames consist of two arms or bars, E E', joined together at their forward ends, as at $E^2$, and hinged to the transverse bar B by a loose sleeve or collar, $E^3$. The parts E E' $E^2$ $E^3$ are preferably cast in one piece, as shown. To prevent the gang-frame from slipping laterally on the bar B the collar or sleeve $E^3$ is provided with a slot, e, wherein fits a key or feather, secured to bar E, the slot being somewhat longer than the key, to allow the gang-frame a limited play vertically.

The axle F, to which the harrow-disks are attached, is mounted on the bars E E' in bearings G G'. The bearing G, supported on bar E, is pivoted, at g, to the bar, so that it can oscillate horizontally. The bearing G', supported on the other bar, E', is arranged to slide on said bar longitudinally, the bearing being mounted in ways of any suitable character. It will be seen that the axle F when thus mounted can have its inner end moved so that it shall be inclined to the line of draft at any angle desired.

H H represent links, each loosely connected at one end to a sliding bearing, G', and at the other end to an arm, *i*, carried by a rocking bar, I. This rocking bar I is supported on the transverse bar B by means of collars *i' i'*, which permit it to be rocked thereon. K is a lever attached to the rocking bar I, and situated within convenient reach of the driver, who is enabled thereby to move the axles of the disk-gangs to any desired position.

K' is a spring-rack secured to the tongue B, immediately in front of the driver's seat, provided with a series of teeth at *k*, and with a pedal, *k'*, by which the operator can with his foot release the lever from the rack. When not held down the spring-rack K' automatically engages with the rocking bar I. The arms *i*, carried by the rocking bar I, are connected with the links H at points below the transverse bar B—that is, below the axis on which the gang-frames are hinged to the main frame; and as said bar I rotates about the transverse bar B, the arms *i* have, as will be seen, an eccentric movement. When the parts are constructed and connected substantially thus, it not only results that the driver is able at any time to adjust, by means of lever K, the positions of all the gangs together, but also that the inner end of the axle of each gang shall be automatically thrust forward irrespective of the other gangs whenever any one of these meet an obstruction or elevation. This throwing forward the end of the gang-axle results in pulverizing the soil and reducing it to a greater extent than when the said end of the axle is farther to the rear. When a gang is thus by itself elevated by an obstruction or elevation, it is lifted about the bar B as a center, whereupon the link H draws the bearing G' forward, which sets the axle at a different angle to the line of draft, and this is accomplished automatically, and without any attention from the driver.

Other devices in lieu of the parts I *i* H may be used for adjusting the position of the gangs, as eccentrics mounted and turning upon the main transverse frame and connected with the gangs in the manner usually employed for connecting eccentrics may be substituted for the above-described construction. In the harrow shown three concavo-convex harrow-disks, L L' L², are represented as being mounted on each gang-frame, one of the disks being inside of both arms E E', another outside the same, and the third between them. The disks may be fastened to the axle in any preferred manner.

M M are cross-pieces fastened to the outer ends of the arms E E' of each disk-gang, said arms being extended backward from the bearings G G' to points somewhat in rear of the harrow-disks.

It has been found that when rotating disks of the character shown are used for harrowing soft, moist, and sticky soils, devices must be combined therewith for scraping them to remove soil or other matter that may adhere thereto. It has also been found that the scrapers thus used must not be allowed to remain permanently against the disks, as straws, roots, &c., will accumulate upon them and ultimately prevent the disks from turning. To overcome this difficulty it has been customary to attach to the harrow a frame situated over the gangs and to connect movable scrapers thereto and combine with the scrapers a lever for moving them to and from the disks. When two or more gangs have been used it has been necessary to use for each gang a separate frame-work and a separate lever and series of scrapers.

I have devised and shown means for cleaning or scraping the disks of all the gangs simultaneously and arranged so that they can be operated by means of the lever wherewith the position of the disk-gangs is adjusted.

The scrapers are represented at N N, of which there are three (in the construction shown) attached to or formed with each cross-piece M, above described. The rearwardly-projecting arms E E' are so shaped as to bring the cross-pieces M on the same horizontal plane, substantially, with the gang-axles when the various parts of the machine are in working position. From the cross-pieces M the scrapers N project horizontally forward. The scrapers are made of comparatively thin strips of metal, which are so shaped or situated as to have the edges in substantially vertical planes, causing the scraping-edge of each to project downward. When the scrapers are constructed, attached, and situated as described, they more readily clear themselves of any adhering matter than when they are arranged in a pendent position to clean or scrape the disks with a rearwardly-projecting vertical edge.

When the disk-gangs are set at the sharpest angle necessary for the hardest and toughest soils, the disks and the gang-frames are in such positions relative to each other that the scrapers N are at a comparatively short distance from the concave sides of the disks, the machine being constructed to hold the scrapers preferably about one-half of an inch from said concave surface when the gangs are set at the last-mentioned angle. Moreover, the parts are so related that the lever K shall be held by the last notch of rack *k* when the gangs are at the sharpest angle, and it will be seen that the operator can, by pulling the lever K somewhat to the rear of the last notch, cause the gangs to swing still farther, until the scrapers N come in contact with the concave sides of the disks, where it is necessary to hold them but a short time, as the disks are cleansed by a single revolution.

It will be seen that the scrapers are brought into operation, not in the ordinary manner by moving them toward the disks, but by moving the disks toward the scrapers. The bearing G of the gang-axle is pivoted to the gang-arm E a short distance in front of the axle, as shown at *g*, so that when the inner end of the axle is drawn forward the gang is moved endwise toward the scrapers, the whole gang moving about the point g as a center. This assists largely in bringing the disks into proper contact with the scrapers.

From an examination of the drawings it will be seen that the lower ends of the pivoted levers D (the construction and arrangement of which have already been described) rest upon the gang-frames E E' E² near their forward ends, and that the weight of the main frame, the draft devices, and the driver is supported by means of the levers D upon the gang-frames. These parts thus act as equalizing-levers, operating to distribute the weight of the parts above enumerated in equal proportions to all the gangs, and forcing all of them to cut to the same depth.

What I claim is—

1. The combination of the following elements, viz: two or more gangs of disks, each having a separate axle, a draft-frame, and a transverse frame, joined rigidly together and supported entirely upon the cutting-disks, two or more swinging gang-frames situated entirely in the rear of the transverse frame and connected thereto independently of each other, and bearings for the gang-axles respectively situated between the ends of the axles, and supported upon the swinging gang-frames, whereby said bearings rise and fall with the axles relatively to the main transverse frame, substantially as set forth.

2. In a rotating-disk harrow, the combination, substantially as hereinbefore set forth, of the following elements, viz: a transverse connecting-frame, two or more axles, each carrying a series of cutting-disks, automatically-swinging frames for supporting the cutting-disks, and the bars E³, rigidly attached to the gang-frames and hinged at their front ends directly to the transverse frame.

3. The combination of the following elements, viz: a draft-tongue, a transverse frame rigidly connected to said tongue, cutting-disks arranged to support the entire weight of the transverse connecting-frame, gang-frames pivoted independently of each other directly to the transverse frame on horizontal lines transverse to the lines of draft, whereby both ends of each gang-axle automatically rise together and fall together and said axles swing independently of each other, substantially as set forth.

4. The combination of the following elements, viz: rotating cutting-disks, a transverse frame supported entirely upon the cutting-disks, gang-frames hinged to the transverse frame on horizontal lines transverse to the lines of draft and arranged to rise and fall automatically, disk-axles supported on the gang-frames and arranged to have both ends of each axle rise together and fall together, and stops which limit the automatic movements of the gang-frames, substantially as set forth.

5. In a rotating-disk harrow, the combination, substantially as hereinbefore set forth, of the following elements, viz: a transverse connecting-frame, two or more gang-frames hinged directly to the transverse frame and arranged to freely swing automatically thereon, rotating cutting-disks carried by said gang-frames and arranged to support the entire weight of the frame, and an intermediate equalizing mechanism secured rigidly to the transverse frame and arranged to rest loosely upon the gang-frames, whereby the weight of the frames is supported upon the cutting-disks, and the gang-frames are allowed to automatically conform to the surface of the ground.

6. In a rotating-disk harrow, the combination, with a transverse frame and two or more disk-gangs arranged to automatically oscillate vertically, of the gang-frames E E', which at their front ends are hinged directly to the transverse frame, and which while oscillating retain the gang-axles in substantially horizontal lines, substantially as set forth.

7. In a rotating-disk harrow, the combination, with a vertically-oscillating gang of disks mounted on an axle, of an automatic adjusting mechanism, whereby the inclination of the gang-axle to the line of draft is automatically altered by the vertical movement of the gangs, substantially as and for the purposes set forth.

8. The combination of the following elements, viz: a main frame, a vertically-swinging gang-frame hinged to the main frame, a sliding axle supported on the hinged gang-frame, a sliding bearing and a pivoted bearing for the axle, both supported on said gang-frame, and an adjusting mechanism, by which the position of said axle is adjusted both automatically and at the will of the operator, substantially as set forth.

9. In a rotating-disk harrow, the combination, with a gang-frame and a disk-axle, of a sliding bearing and an oscillating bearing for said axle supported on said gang-frame, substantially as set forth.

10. In a rotating-disk harrow, the combination of the following elements, viz: a main frame, a gang-frame pivoted to the main frame, a rocking mechanism hinged to the main frame, a gang-axle arranged to rotate in a sliding bearing and in a pivoted bearing, and a link connected to the gang-axle and attached eccentrically to the rocking mechanism.

11. The combination, with the main frame and two or more disk-gangs hinged thereto and mounted on sliding axles, of the rocking bar I, connected to all of the disk-axles, substantially as set forth.

12. In a rotating-disk harrow, the combination of the following elements, viz: a main frame, a gang-frame pivoted to the main frame, a disk-scraper rigidly attached to the gang-frame, and a rotating cutting-disk arranged to oscillate horizontally on the gang-frame independently of the disk-scraper, and to be moved toward the scraper when the disks are to be cleaned, substantially as set forth.

13. The combination of the following elements, viz: a main frame, a gang of two or more cutting-disks arranged to oscillate vertically on the main frame, a gang-frame having the arms E E' situated between the adjacent disks and extending backward from the central line of the disks to their rear edges, the cross-bar M, secured to the rear ends of said arms E E', and the scrapers N, rigidly attached to the cross-bar M, substantially as set forth.

14. In a rotating-disk harrow, the combination, with a rotating cutting-disk and mechanism for adjusting the angle of said disk relative to the line of draft, of a scraper adapted to be brought into play by the angular adjustment of said disk.

15. In a rotating-disk harrow, the combination, with horizontally-adjusting disk-gangs and scrapers arranged to clean the disks, of mechanism operated by a single lever, whereby the inclination of the gangs is altered, and whereby the scrapers are brought into operation, substantially as set forth.

16. The combination, with a gang-frame, of a rotating cutting-disk mounted on said frame, a disk-axle arranged to slide on said frame, and a bearing for said axle pivoted to the frame in front of the axle, whereby the axle is caused to move endwise when it is oscillated about the pivot of said bearing, substantially as set forth.

In testimony that I claim the foregoing I have hereunto set my hand.

JAY S. CORBIN.

Witnesses:
  A. CORBIN, Jr.,
  H. M. MUNSELL,
  J. R. AUSTIN.